United States Patent [19]

Hashimoto et al.

[11] 4,382,670
[45] May 10, 1983

[54] FOCAL PLANE SHUTTER BLADE ARRANGEMENT

[75] Inventors: Teiji Hashimoto, Kawasaki; Michio Senuma, Tokyo; Fumio Shimada, Kawasaki, all of Japan

[73] Assignees: Canon Kabushiki Kaisha, Tokyo; Canon Denshi Kabushiki Kaisha, Daitama, both of Japan

[21] Appl. No.: 342,205

[22] Filed: Jan. 25, 1982

[30] Foreign Application Priority Data

Feb. 4, 1981 [JP] Japan .............................. 56-14743[U]

[51] Int. Cl.³ .............................................. G03B 9/40
[52] U.S. Cl. ..................................... 354/246; 354/250
[58] Field of Search ................ 354/245, 246, 249, 250

[56] References Cited

U.S. PATENT DOCUMENTS

| 3,829,878 | 8/1974 | Onda et al. | 354/246 |
| 3,842,429 | 10/1974 | Kitai et al. | 354/246 |
| 4,162,840 | 7/1979 | Ooba et al. | 354/246 |
| 4,231,650 | 11/1980 | Saito et al. | 354/246 |

Primary Examiner—Alan Mathews
Attorney, Agent, or Firm—Toren, McGeady and Stanger

[57] ABSTRACT

Disclosed is a focal plane shutter for a camera having a shutter blade group consisting of a plural number of light shading thin plates held with two arms, so designed that the slit forming blade positioned at the end of the arm and a light shading auxiliary blade positioned next to the above are made to move in parallel by way of a parallel linkage and that a plural number of other auxiliary blades are mounted rotatably around the shaft provided on the one arm and engaged with a common shaft provided on the other arm in such a manner that along with the rotation of the latter arm they are rotated with the latter shaft.

1 Claim, 2 Drawing Figures

FOCAL PLANE SHUTTER BLADE ARRANGEMENT

BACKGROUND OF THE INVENTION

1. Field of the Invention

The present invention relates to a focal plane shutter having a leading blade group and a trailing blade group composed of a plurality of blades particularly consisting of light shading thin plates.

2. Description of the Prior Art

Generally this type of focal plane shutter is so designed that the leading blade group and the trailing blade group run upwardly and downwardly so as to open and close the exposure opening, with both blade groups being loaded and with both, being folded, above and beneath the opening when the opening is not covered. In consequence, in case the number of blades is small the size of the blades must be large with the result that the blade loading spaces above and beneath the opening have to be large, which increases the size, especially the height of the camera.

In order to overcome the above shortcomings it is desirable for the number of the blades to be increased so as to make the size of the blades small.

In the state where the shutter blades cover the opening, the edges of the blades of this kind of shutter overlap each other, and the width of the overlapped parts is sought to be about 4 mm in order to prevent light leakage.

Consequently, taking the above into consideration, it is desired that the number of the blades should be about 5-7 for a camera in which 35 mm film is used.

In this case it is desired that the blades be held in parallel by means of two arms in such a manner that along with the rotation of the arms around fixed shafts the blades are translated in parallel to the upper and the lower edge of the opening. Thus, when the number of the blades is large the number of the shafts on the arm becomes large so that the length of the arms must be large in order to avoid interference of the blades with the shafts. This makes the horizontal size of the shutter large.

A shutter is known which is so designed that only one of the blades for forming the slit is translated in parallel while others are rotated around one shaft along with the rotation of the above arms. However, in this case the forms of the cam grooves to be provided in the blades become complicated so that smooth shutter operation cannot be expected or the opening covering efficiency is inferior, which is inconvenient.

SUMMARY OF THE INVENTION

It is an object of the present invention to eliminate the above shortcomings.

In accordance with the present invention the number of the blades is at least 5 so as to make the size of the blades small, while the slit forming blades and the blade adjacent thereto are held by means of two arms so as to be translated in parallel, whereby other blades are held to be rotatable around the shaft on the other arm in such a manner that along with the rotation of the latter arm the blades are rotated around the shaft of the former arm.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENTS

Figure 1:
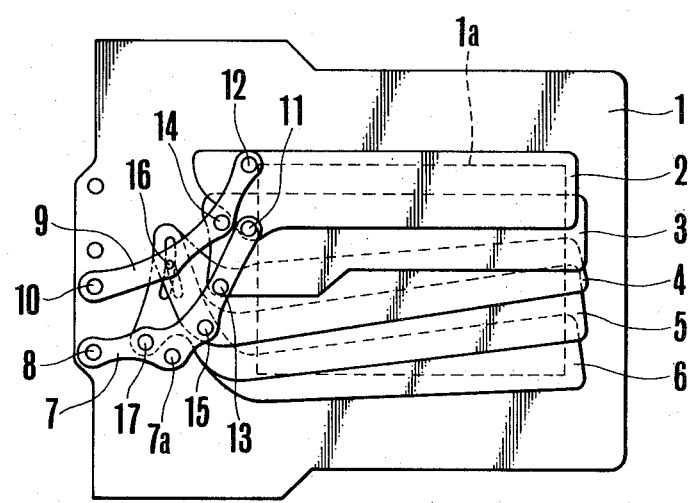
FIG. 1 shows an embodiment of the present invention in plane view.
Figure 2:
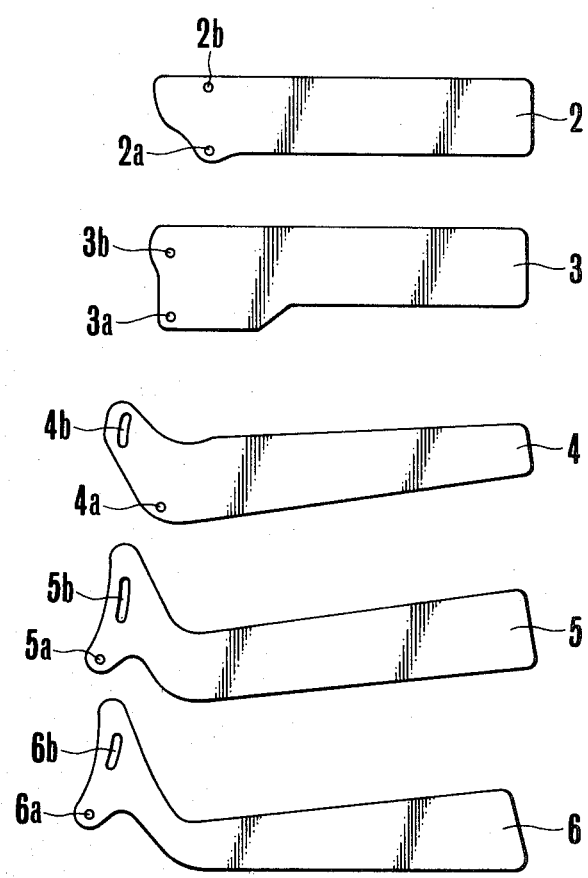
FIG. 2 shows the shapes of the shutter blades of the present invention in plane view.

FIG. 1 shows the leading shutter blade group covering the exposure opening. In the drawing 1 is the shutter base plate and 1a the exposure opening, 2 the slit forming blade, 3 the first auxiliary blade for light shading and 4-6 the second to the fourth auxiliary blades. These blades are mounted, being superposed over each other, on the two arms 7 and 9 rotatable around the fixed shafts 8 and 10. On each arm the shafts 11, 13, 15 and 17 and 12, 14 and 16 for supporting the blades are provided. The two holes 2a and 2b provided near the side ends of the slit forming blade 2 are engaged on the shafts 11 and 12 on the arm, the hole 3a and 3b in the first auxiliary blade 3 on the shafts 13 and 14, and the shafts 8, 10, 11 and 12 and 8, 10, 13 and 14 form parallelogram in such a manner that along with the clockwise rotation of both arms the blades are translated downwardly in parallel as shown in the drawing.

The hole 4a of the auxiliary blade 4 is engaged on the shaft 15 on the arm 7, while in the cam groove 4b the shaft 16 on the arm 9 is engaged in such a manner that along with the rotation of the both arms the blade 4 is translated downwards with the shaft 15 while it rotates around the shaft 15 by means of the cooperation of the cam groove with the shaft.

The holes 5a and 6a of the auxiliary blades 5 and 6 are engaged on the shaft 17 on the arm 7, while in the cam grooves 5b and 6b the shaft 16 on the arm 9 is engaged in such a manner that along with the rotation of both arms the blades 5 and 6 are translated downwardly while they are slightly rotated around the shaft 17 by means of the cams.

The arm 7 is provided with a hole 7a in such a manner that from the driving part not shown in the drawing the driving power is transmitted to the arm via the hole.

The trailing shutter blades are omitted from the drawing. However, they have the same construction as that of the above leading shutter blades. The only difference is that they are arranged in the reversed relation to the leading shutter blades, whereby in the state in that the leading shutter blades cover the exposure opening as is shown in FIG. 1, the trailing shutter blades are loaded, being folded, above the opening, while in the state that the leading shutter blades have run downwards the tail shutter blades cover the opening.

As explained above in accordance with the present invention the slit forming blade and the one auxiliary blade next to the slit forming blade are held in parallel by means of two arms, while the other auxiliary blade is pivoted on the one arm so as to be rotated by means of the common shaft 16 on the other arm and the cam groove so that the number of the shafts on the arms can be reduced with the result that the number of steps in the manufacturing process can be reduced. Further, because the rotation shafts of the blades are provided on the arm, the rotation angle of each auxiliary blade can be small so that the shapes of the cam grooves are simple and the movement of the shutter blade is smooth.

While a specific embodiment of the invention has been shown and described in detail to illustrate the application of the inventive principles, it will be understood that the invention may be embodied otherwise without departing from such principles.

What is claimed is:

1. A focal plane shutter having two shutter blade groups consisting of at least five light shading thin plates opening and closing the shutter opening comprising:

a shutter base plate provided with an exposure opening;

two arms rotatably held respectively on two shafts on said base plate so as to drive said shutter;

said blade groups including a slit forming blade rotatably held at the ends of said two arms so as to be translated in parallel along with rotation of said arms, said slit forming blade having link points forming a parallelogram together with said two shafts on said base plate;

an auxiliary blade linked at a position adjacent to that of said slit forming blade so as to be translated in parallel along with rotation of said arms; and a plurality of auxiliary blades respectively held on one shaft on one of said arms, with cam grooves provided therein being engaged on a common shaft on the other of said arms in such a manner that along with the rotation of said one arm they move around the former shaft while being moved together with said one arm.

* * * * *